(12) United States Patent
Liu et al.

(10) Patent No.: US 7,755,298 B2
(45) Date of Patent: Jul. 13, 2010

(54) POWER SUPPLY CIRCUIT WITH SOFT START CIRCUIT

(75) Inventors: Han-Tao Liu, Shenzhen (CN); Tong Zhou, Shenzhen (CN); Hua Xiao, Shenzhen (CN); Kun Le, Shenzhen (CN); Jian-Hui Lu, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 274 days.

(21) Appl. No.: 12/005,814

(22) Filed: Dec. 27, 2007

(65) Prior Publication Data

US 2008/0158919 A1    Jul. 3, 2008

(30) Foreign Application Priority Data

Dec. 29, 2006    (TW) ............................ 95149723 A

(51) Int. Cl.
 *H05B 39/02* (2006.01)
(52) U.S. Cl. ....................................... 315/225; 345/211
(58) Field of Classification Search ................. 323/223, 323/265, 282, 288, 349, 351; 315/209 R, 315/225; 345/204, 211, 212
See application file for complete search history.

(56) References Cited

U.S. PATENT DOCUMENTS

| 6,813,170 | B2* | 11/2004 | Yang | ........................ 363/56.09 |
| 2006/0256588 | A1 | 11/2006 | Chen | |

FOREIGN PATENT DOCUMENTS

CN    2741268 Y    11/2005

* cited by examiner

*Primary Examiner*—Gary L Laxton
(74) *Attorney, Agent, or Firm*—Wei Te Chung

(57) ABSTRACT

An exemplary power supply circuit (20) includes a scaler (21), a field-effect transistor (23), a pulse width modulation circuit (25), and a capacitor (29). The scaler includes an output port (213). The pulse width modulation circuit includes an input port (251). The input port of the pulse width modulation circuit is grounded via the capacitor. The field-effect transistor includes a gate electrode (231), a source electrode (232), and a drain electrode (233). The gate electrode is connected to the output port of the scaler. The source electrode is grounded. The drain electrode is connected to the input port of the pulse width modulation circuit.

8 Claims, 1 Drawing Sheet

POWER SUPPLY CIRCUIT WITH SOFT START CIRCUIT

FIELD OF THE INVENTION

The present invention relates to power supply circuits, and particularly to a power supply circuit with soft start circuit.

BACKGROUND

Power supply circuits are widely used in modern electronic products such as flat panel displays. The power supply circuit is typically used for switching between two or more input voltage signals when the electronic product is in different working states.

FIG. 2 is a circuit diagram of a conventional power supply circuit used in a liquid crystal display (LCD). The power supply circuit 10 includes a scaler 11, a soft start circuit 13, a pulse width modulation circuit 15, an inverter 17, and a start-up capacitor 19.

The scaler 11 is connected to the pulse width modulation circuit 15 via the soft start circuit 13. Therefore, the soft start circuit 13 functions as a switch element for switching the pulse width modulation circuit 15. The pulse width modulation circuit 15 controls the inverter 17 to output driving voltages, for driving an electronic apparatus (not shown).

However, the soft start circuit 13 includes two bipolar junction transistors 131, 133 and three bias resistors 135, 137, 139. The soft start circuit 13 has a complex circuit configuration. Moreover, the bipolar junction transistors 131, 133 are current-controlled switch elements. Thus, a direct current (DC) power supply 102 is needed to supply bias voltage to the soft start circuit 13. Thus, the power supply circuit 10 has high power consumption. Meanwhile, the complex circuit configuration of the soft start circuit 13 is liable to causes some electric noise. The electric noise causes negative influence to a reliability of the power supply circuit 10.

Accordingly, what is needed is a power supply circuit that can overcome the above-described deficiencies.

SUMMARY

One exemplary power supply circuit includes a scaler, a field-effect transistor, a pulse width modulation circuit, and a capacitor. The scaler includes an output port. The pulse width modulation circuit includes an input port. The input port of the pulse width modulation circuit is grounded via the capacitor. The field-effect transistor includes a gate electrode, a source electrode, and a drain electrode. The gate electrode is connected to the output port of the scaler. The source electrode is grounded. The drain electrode is connected to the input port of the pulse width modulation circuit.

In another embodiment, a power supply circuit includes a scaler arranged for outputting a control voltage; a capacitor; a field-effect transistor including a gate electrode for receiving the control voltage, a source electrode being grounded, and a drain electrode being grounded via the capacitor; and a pulse width modulation circuit including an input port, the input port being electrically connected to the drain electrode of the field-effect transistor.

Other novel features and advantages will become more apparent from the following detailed description when taken in conjunction with the accompanying drawings. In the drawings, all the views are schematic.

DETAILED DESCRIPTION OF PREFERRED EMBODIMENTS

Figure 1:
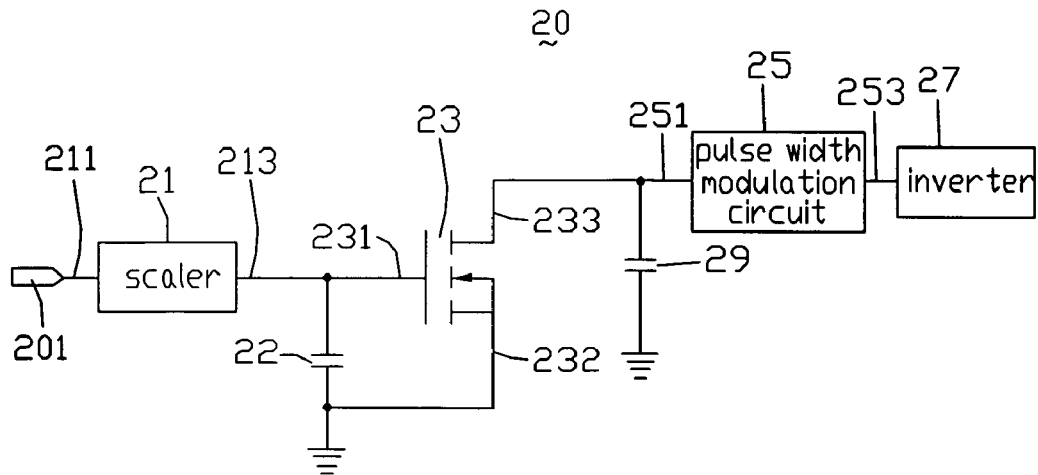
FIG. 1 is a circuit diagram of a power supply circuit according to an exemplary embodiment of the present invention.
Figure 2:
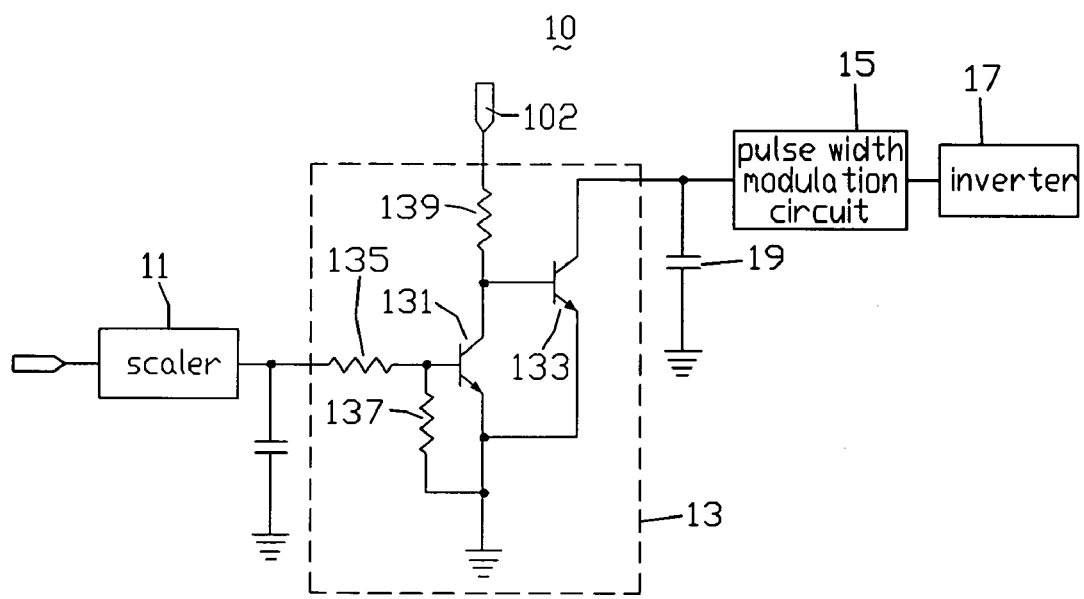
FIG. 2 is a circuit diagram of a conventional power supply circuit.

FIG. 1 is a circuit diagram of a power supply circuit according to an exemplary embodiment of the present invention. The power supply circuit 20 includes an input port 201, a scaler 21, a filter capacitor 22, a field-effect transistor 23, a pulse width modulation circuit 25, an inverter 27, and a capacitor 29. The power supply circuit 20 can for example be used in an LCD device.

The scaler 21 includes an input port 211 and an output port 213. The input port 211 is electrically connected to the input port 201 of the power supply circuit 20. The output port 213 is grounded via the filter capacitor 22. The scaler 21 can for example be a GM5621 model.

The field-effect transistor 23 includes a gate electrode 231, a source electrode 232, and a drain electrode 233. The gate electrode 231 is electrically connected to the output port 213 of the scaler 21. The source electrode 232 is grounded. The drain electrode 233 is grounded via the capacitor 29. The field-effect transistor 23 is an n-channel enhancement mode metal oxide semiconductor field-effect transistor (N-MOSFET). The field-effect transistor 23 can for example be a RK7002 model.

The pulse width modulation circuit 25 includes an input port 251 and an output port 253. The input port 251 is electrically connected to the drain electrode 253 of the field-effect transistor 23. The output port 253 is electrically connected to the inverter 27. The pulse width modulation circuit 25 can for example be an IC805 model.

When the scaler 21 is in an on-state, the scaler 21 outputs a low voltage, such as 0 volt (V), via the output port 213. When the scaler 21 is in an off-state, the scaler 21 outputs a high voltage, such as 3.3 volt (V), via the output port 213.

When a turn-on signal is sent to the input port 201, the scaler 21 receives the turn-on signal through the input port 211 and starts to work. Then the scaler 21 outputs a low voltage via the output port 213. The low voltage is applied to the gate electrode 231 of the field-effect transistor 23. Thus the field-effect transistor 23 is in a high-resistance state, and the field-effect transistor 23 is switched off. Then a power supply (not shown) integrated in the pulse width modulation circuit 25 starts charging up the capacitor 29. After about 450 microseconds (us), a voltage of the capacitor 29 rises to a predetermined start-up voltage, for example, 2V. The start-up voltage is transmitted into the pulse width modulation circuit 25. Then the pulse width modulation circuit 25 starts to work. The pulse width modulation circuit 25 drives the inverter 27 to generate a driving voltage. The driving voltage can be used to drive an electronic apparatus, such as a backlight module of an LCD device.

When a turn-off signal is sent to the input port 201, the scaler 21 receives the turn-off signal through the input port 211 and then stop working. Then the scaler 21 outputs a high voltage via the output port 213. The high voltage is applied to the gate electrode 231 of the field-effect transistor 23. Thus the field-effect transistor 23 is in a low-resistance state, and the field-effect transistor 23 is switched on. Thus, the drain electrode 233 is grounded via the field-effect transistor 23. The capacitor 29 starts to discharge via the field-effect transistor 23. When the voltage of the capacitor 29 falls down to a predetermined low voltage, the pulse width modulation 25 stops driving the inverter 27. Then the inverter 27 stops generating driving voltage.

With the above-described configuration, the field-effect transistor 23 functions as a soft start switching element to control the charging and discharging of the capacitor 29. The power supply circuit 20 has a simple circuit configuration. Moreover, the field-effect transistor 23 is a voltage-controlled switch element. The additional DC power supply required in the conventional art is not needed for the power supply circuit 20. The power supply circuit 20 has a lower power consumption, a lower signal noise, and a higher reliability.

It is to be further understood that even though numerous characteristics and advantages of various embodiments have been set forth in the foregoing description, together with details of the structures and functions of the embodiments, the disclosure is illustrative only, and changes may be made in detail to the full extent indicated by the broad general meaning of the terms in which the appended claims are expressed.

What is claimed is:

1. A power supply circuit for a liquid crystal display (LCD), the power supply circuit comprising:
    a first input port for receiving a turn-on signal and a turn-off signal, the turn-on signal being used to control the power supply circuit to output driving voltages to the LCD, the turn-off signal being used to control the power supply circuit to stop outputting the driving voltages to the LCD;
    a scaler directly connected to the first input port to receive the turn-on signal and the turn-off signal, the scaler outputting a low voltage when receiving the turn-on signal and outputting a high voltage when receiving the turn-off signal, the scaler comprising an output port;
    a capacitor; and
    a pulse width modulation circuit comprising a second input port, the second input port being grounded via the capacitor; and
    a field-effect transistor, the field-effect transistor comprising a gate electrode connected to the output port of the scaler, a source electrode being grounded, and a drain electrode connected to the second input port of the pulse width modulation circuit, the field-effect transistor being a voltage-controlled field-effect transistor.

2. The power supply circuit as claimed in claim 1, further comprising an inverter, wherein the pulse width modulation controls the inverter to generate the driving voltages.

3. The power supply circuit as claimed in claim 1, wherein the scaler outputs the low voltage through the output port when in an on-state; the scaler outputs the high voltage when in an off-state.

4. The power supply circuit as claimed in claim 1, further comprising a filter capacitor, wherein the output port of the scaler is grounded via the filter capacitor.

5. The power supply circuit as claimed in claim 1, wherein the field-effect transistor is an n-channel enhancement mode metal oxide semiconductor field-effect transistor.

6. The power supply circuit as claimed in claim 1, wherein the field-effect transistor is a RK7002 model.

7. The power supply circuit as claimed in claim 1, wherein the scaler is a GM5621 model.

8. The power supply circuit as claimed in claim 1, wherein the pulse width modulation circuit is an integrated circuit of IC805.

* * * * *